US006228131B1

United States Patent
Gröbel et al.

(12) United States Patent
(10) Patent No.: US 6,228,131 B1
(45) Date of Patent: May 8, 2001

(54) DYE MIXTURES COMPRISING WATER-SOLUBLE FIBER-REACTIVE AZO DYES, PREPARATION THEREOF AND USE THEREOF

(75) Inventors: Bengt-Thomas Gröbel, Waldems; Christian Schumacher, Kelkheim; Gerhard Lippert, Hofheim; Mieke Schaffeld, Bad Camberg; Karl Krieger, Hünstetten, all of (DE); Dierk Röhrig, Jakarta (ID)

(73) Assignee: Dystar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 09/408,109

(22) Filed: Sep. 29, 1999

(30) Foreign Application Priority Data

Sep. 30, 1998 (DE) .............................................. 198 44 841

(51) Int. Cl.$^7$ .............................. C09B 67/24; D06P 1/384
(52) U.S. Cl. ............................ 8/549; 8/641; 8/918; 8/924
(58) Field of Search ................................. 8/543–549, 641

(56) References Cited

U.S. PATENT DOCUMENTS 4,185,959 * 1/1980 Imada et al. .
5,611,821   3/1997 Huang et al. .
5,779,739   7/1998 Von Der Eltz et al. .
5,803,930 * 9/1998 Russ et al. .

FOREIGN PATENT DOCUMENTS

| 2142742 | 8/1995 | (CA) . |
| 24 42 553 | 1/1976 | (DE) . |
| 0 668 328 A2 | 8/1995 | (EP) . |
| 0 735 112 A2 | 10/1996 | (EP) . |
| 2 749 314 | 12/1997 | (FR) . |
| 01770661 | 5/1989 | (JP) . |
| 1-170661 | 7/1989 | (JP) . |

* cited by examiner

*Primary Examiner*—Margaret Einsmann
(74) *Attorney, Agent, or Firm*—Connolly Bove Lodge & Hutz LLP

(57) ABSTRACT

Dye mixtures comprising water-soluble fiber-reactive azo dyes, preparation thereof and use thereof Described are dye mixtures comprising yellow dyes of the formulae indicated and defined in claim 1, which are useful for dyeing hydroxyl- and/or carboxamido-containing material, especially fiber material, such as cellulose fibers, for example cotton and filament viscose, and wool and also synthetic polyamide fibers.

15 Claims, No Drawings

DYE MIXTURES COMPRISING WATER-SOLUBLE FIBER-REACTIVE AZO DYES, PREPARATION THEREOF AND USE THEREOF

DESCRIPTION

Dye mixtures comprising water-soluble fiber-reactive azo dyes, preparation thereof and use thereof This invention relates to the technical field of fiber-reactive azo dyes.

Japanese Patent Application Publication Hei-1-170 661 discloses mixtures of yellow-dyeing monoazo dyes having a fiber-reactive group of the vinyl sulfone series, but they have certain application defects.

As with individual dyes, it is important for dye mixtures to provide dyeings having a good color yield, i.e., dyeings whose depth of shade is very high in relation to the amount of dye used, because of the coloring property of the dye mixture and because of its dyeing characteristics, such as good affinity and a high yield of fixation. In general, the color yield obtained with a mixture of two dyes will be the average of the color yields of the individual dyes. The color yield of a mixture of two dyes will therefore be lower than the color yield of the individual dye having the larger color yield property.

The present invention, then, provides dye mixtures which provide dyeings having a color yield which is surprisingly distinctly higher than the average of the color yields of the dyeings of the individual dyes in the dye mixture. This synergistic effect also shows itself in improved build-up characteristics on the part of the mixture of the invention compared with the individual dyes in the mixture.

The invention accordingly provides dye mixtures comprising one or more, such as two or three, preferably 1 or 2, dyes selected from the group of the dyes of the hereinbelow indicated and defined general formula (1) and one or more, such as two or three, preferably 1 or 2, dyes selected from the group of the dyes of the hereinbelow indicated and defined general formula (2) in a molar ratio of the dye or dyes (1) to the dye or dyes (2) of 75:25 to 25:75, preferably 65:35 to 35:65, more preferably 60:40 to 40:60.

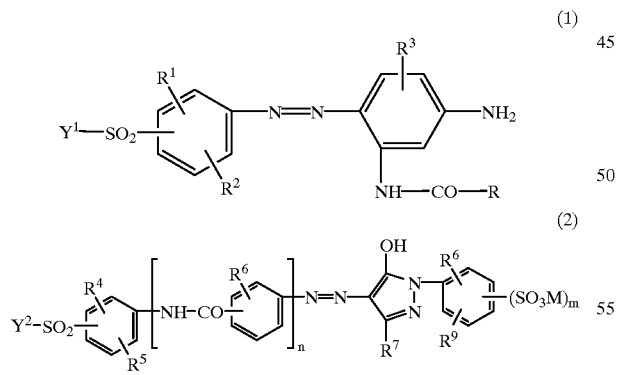

In these formulae:

M is hydrogen or an alkali metal, such as sodium, potassium or lithium;

$Y^1$ is vinyl or is ethyl which is substituted in the β-position by an alkali-eliminable substituent, for example by chlorine, sulfato, thiosulfato, phosphate, alkanoyloxy of 2 to 5 carbon atoms, such as acetyloxy, and sulfobenzoyloxy, and is preferably vinyl, β-chloroethyl or β-sulfatoethyl, more preferably vinyl or β-sulfatoethyl;

$Y^2$ has one of the meanings of $Y^1$;

$R^1$ is hydrogen, chlorine, alkyl of 1 to 4 carbon atoms, such as ethyl or especially methyl, alkoxy of 1 to 4 carbon atoms, such as ethoxy or especially methoxy, carboxyl or sulfo, preferably hydrogen, methyl or methoxy, especially hydrogen;

$R^2$ is hydrogen, alkyl of 1 to 4 carbon atoms, such as ethyl or especially methyl, or alkoxy of 1 to 4 carbon atoms, such as ethoxy or especially methoxy, preferably hydrogen, methyl or methoxy, especially hydrogen;

$R^3$ is hydrogen, alkyl of 1 to 4 carbon atoms, such as ethyl or especially methyl, alkoxy of 1 to 4 carbon atoms, such as ethoxy or especially methoxy, or sulfo, preferably hydrogen, methyl or methoxy or especially sulfo, and $R^3$ is preferably disposed para to the —NH—CO—R group;

R is amino or alkyl of 1 to 6 carbon atoms, preferably of 1 to 3 carbon atoms, such as ethyl or especially methyl, where alkyl may be substituted, for example by hydroxyl, sulfo, carboxyl, sulfato, phosphato or a —$SO_2$—$Y^3$ group, where $Y^3$ has one of the meanings of $Y^1$;

$R^4$ is hydrogen, chlorine, alkyl of 1 to 4 carbon atoms, such as ethyl or especially methyl, alkoxy of 1 to 4 carbon atoms, such as ethoxy or especially methoxy, or sulfo, preferably hydrogen, methyl or methoxy, especially hydrogen;

$R^5$ is hydrogen, alkyl of 1 to 4 carbon atoms, such as ethyl or especially methyl, or alkoxy of 1 to 4 carbon atoms, such as ethoxy or especially methoxy, preferably hydrogen, methyl or methoxy, especially hydrogen;

$R^6$ is hydrogen, alkyl of 1 to 4 carbon atoms, such as ethyl or especially methyl, alkoxy of 1 to 4 carbon atoms, such as ethoxy or especially methoxy, or sulfo and preferably is hydrogen, methyl, methoxy or sulfo, particularly preferably hydrogen;

n is zero or 1;

$R^7$ is methyl or carboxyl;

$R^8$ is hydrogen, alkyl of 1 to 4 carbon atoms, such as ethyl or especially methyl, alkoxy of 1 to 4 carbon atoms, such as ethoxy or especially methoxy, or chlorine, preferably methyl or chlorine, particularly preferably hydrogen;

$R^9$ is hydrogen, alkyl of 1 to 4 carbon atoms, such as ethyl or especially methyl, alkoxy of 1 to 4 carbon atoms, such as ethoxy or especially methoxy, or chlorine and preferably is hydrogen;

m is zero, 1 or 2, preferably 1 or 2, particularly preferably 1 (when m is zero, this group is hydrogen);

the $Y^1$—$SO_2$— and $Y^2$—$SO_2$— groups are attached to the benzene nucleus in a position which is preferably meta and particularly preferably para to the azo group and to the —NH—CO— group, respectively;

the —NH—CO— group is attached to the benzene nucleus in the formula (2) in a position which is meta and preferably para to the azo group.

In the above general formulae and also in the subsequent general formulae, the individual constituents of the formulae, whether they bear identical or different designations, can have meanings under their definition which are mutually identical or different.

The terms "sulfo", "thiosulfato", "carboxyl", "phosphato" and "sulfato" cover not only the acid form but also the salt form of the respective groups. Accordingly, sulfo groups are groups conforming to the general formula —SO$_3$M, thiosulfato groups are groups conforming to the general formula —S—SO$_3$M, carboxyl groups are groups conforming to the general formula —COOM, phosphato groups are groups conforming to the general formula —OPO$_3$M$_2$ and sulfato groups are groups conforming to the general formula —OSO$_3$M, where each M is as defined above.

The dyes of the general formulae (1) and (2) are generally known and described for example in European Patent Application Publication No. 0 073 481, British Patent No. 1 124 388 and German Patents Nos. 1 282 213 and 1 206 107.

Of the dyes of the general formula (1) present in the dye mixture of the invention, those must be emphasized in particular where the Y$^1$—SO$_2$— group is meta and particularly preferably para to the azo group, Y$^1$ is vinyl or preferably β-sulfatoethyl, R$^1$ and R$^2$ are independently hydrogen, methyl or methoxy, preferably hydrogen, R$^3$ is sulfo and attached to the benzene nucleus para to the —NH—CO—R group, and R is methyl.

Of the dyes of the general formula (2) present in the dye mixture of the invention, preference is given to those where n is zero, the Y$^2$—SO$_2$— group is meta or para to the azo group, R$^4$ is hydrogen, methyl or methoxy, R$^5$ is hydrogen or methyl, R$^8$ and R$^9$ are both hydrogen and m is 1, this sulfo group preferably being attached to the benzene nucleus in a position which is para to the nitrogen atom of the pyrazolone ring; of these preference is in turn given to those monoazo dyes of the general formula (2) where R$^4$ and R$^5$ are both hydrogen and the Y$^2$—SO$_2$— group is para to the azo group.

Furthermore, of the monoazo dyes of the general formula (2) in the mixture of the invention, particular interest pertains to those where n is 1, R$^4$ and R$^5$ are both hydrogen, the Y$^2$—SO$_2$— group is meta or preferably para to the —NH—CO— group and Y$^2$ is vinyl or β-sulfatoethyl, preferably β-sulfatoethyl, the —NH—CO— group is meta or preferably para to the azo group, R$^6$ is hydrogen, R$^8$ and R$^9$ are both hydrogen and m is 1 and this sulfo group is preferably attached to the benzene nucleus in a position which is para to the nitrogen atom of the pyrazolone ring. p The dyes of the general formula (1) may possess different fiber-reactive —SO$_2$—Y$^1$ groups within the meaning of Y$^1$, especially if they have the same chromophore (the same applies to the dyes of the general formula (2) with regard to Y$^2$ and Y$^3$). More particularly, the dye mixtures may contain dyes of the same chromophore which conform to the general formula (1) and/or dyes of the same chromophore which conform to the general formula (2) where the fiber-reactive groups —SO$_2$—Y$^1$ (or —SO$_2$—Y$^2$ and —SO$_2$—Y$^3$) are, on the one hand, vinylsulfonyl groups and, on the other, β-chloroethylsulfonyl or β-thiosulfatoethylsulfonyl or preferably β-sulfatoethylsulfonyl groups. When the dye mixtures contain the respective dye components partly as dyes having a vinylsulfonyl group, then the fraction of the respective dye which has the vinylsulfonyl group is up to about 30 mol %, based on the respective dye chromophore.

Groups conforming to the general formulae (3a) and (3b)

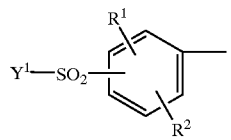

(3a)

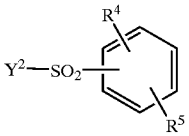

(3b)

which are present in the dyes (1) and (2) are for example 3-(β-sulfatoethylsulfonyl)phenyl, 4-(β-sulfatoethylsulfonyl)phenyl, 2-methyl-5-(β-sulfatoethylsulfonyl)phenyl, 2-methoxy-5-(β-sulfatoethylsulfonyl)phenyl, 4-methyl-3-(β-sulfatoethylsulfonyl)phenyl, 2,5-dimethyl-4-(β-sulfatoethylsulfonyl)phenyl, 2,6-dimethyl-4-(β-sulfatoethylsulfonyl)phenyl, 2-methoxy-4-(β-sulfatoethylsulfonyl)phenyl, 4-methoxy-5-(β-sulfatoethylsulfonyl)phenyl, 2-methoxy-5-methyl-4-(β-sulfatoethylsulfonyl)phenyl, 2,4-dimethoxy-5-(β-sulfatoethylsulfonyl)phenyl, 2,5-dimethoxy-4-(βsulfatoethylsulfonyl)phenyl and 2-sulfo-4-(β-sulfatoethylsulfonyl)phenyl, especially 4-(β-sulfatoethylsulfonyl)phenyl, and also derivatives thereof in which the β-sulfatoethylsulfonyl group is replaced by the vinylsulfonyl or β-thiosulfatoethylsulfonyl or β-chloroethylsulfonyl group.

The dye mixtures of the invention are preparable in a conventional manner, for example by mechanically mixing the individual dyes, whether in the form of their dye powders or granules or their as-synthesized solutions or in the form of aqueous solutions of the individual dyes in general, which may further include customary auxiliaries, or by chemical synthesis in a one-pot reaction, for example by using the diazo components and coupling components of the individual dyes in the same reaction batch. Such methods of synthesis are familiar to those skilled in the art. For instance, in one possible procedure, one or more, such as two or three, aniline compounds of the general formula (4a) and one or more, such as two or three, aniline compounds of the general formula (4b)

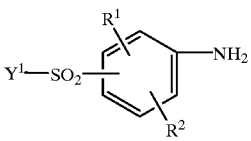

(4a)

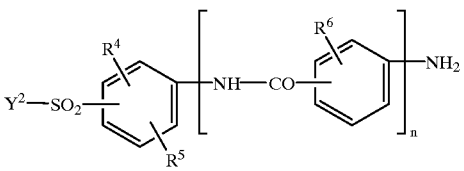

(4b)

where the individual constituents of the formulae are each as defined above, are diazotized together in the same reaction batch in the presence of one or more, such as two or three, compounds of the general formula (5a) and one or more, such as two or three, compounds of the general formula (5b)

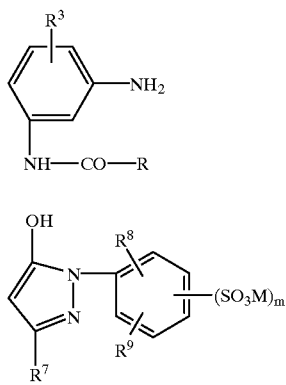

(5a)

(5b)

where the individual constituents of the formulae are each as defined above, each in the corresponding fractions, in a conventional manner, for example by means of nitrous acid in a hydrochloric or sulfuric acid medium, for example at a pH below 2.5 and a temperature between −5° C. and +10° C., and the resultant diazonium compounds, after adjustment to a weakly acidic to neutral pH, are coupled with the compounds (5a) and (5b) in a conventional manner, for example at a temperature between 0° and 30° C., preferably between 10° and 20° C., and at a pH between 3 and 7.5, preferably between 4.5 and 6.5.

The dye mixtures of the invention can be present as a preparation in solid or in liquid (dissolved) form. In solid form, they generally include the electrolyte salts customary for water-soluble and especially for fiber-reactive dyes, such as sodium chloride, potassium chloride and sodium sulfate, and may further comprise the auxiliaries customary in commercial dyes, such as buffer substances capable of setting a pH in aqueous solution between 3 and 7, such as sodium acetate, sodium citrate, sodium borate, sodium bicarbonate, sodium dihydrogenphosphate and disodium hydrogenphosphate, dyeing auxiliaries, dustproofing agents and small amounts of siccatives; if they are present in a liquid, aqueous solution (including the presence of thickeners of the type customary in print pastes), they may also include substances which ensure a long life for these preparations, for example mold preventatives.

In solid form, the dye mixtures of the invention are generally present as pulverulent or granular preparations which include an electrolyte salt with or without one or more of the abovementioned auxiliaries. The dye mixture fraction in the preparations ranges from 10 to 80% by weight, based on the preparation. The buffer substances are generally present in a total amount of up to 5% by weight, based on the preparation. If the dye mixtures of the invention are present in aqueous solution, the total dye content of these aqueous solutions will be up to about 50% by weight, for example between 5 and 50% by weight, and the electrolyte salt content of these aqueous solutions will preferably be below 10% by weight, based on the aqueous solution; the aqueous solutions (liquid preparations) may include the aforementioned buffer substances in an amount which is generally up to 5% by weight, preferably up to 2% by weight.

The separation from their synthesis solution of the chemically produced dye mixtures of the invention can be effected by commonly known methods, for example either by precipitating from the reaction medium by means of electrolytes, for example sodium chloride or potassium chloride, or by evaporating or spray-drying the reaction solution, in which case this reaction solution may have a buffer substance added to it.

The dye mixtures of the invention may include further fiber-reactive dyes which are used for shading the dye mixture, in an amount of up to 5% by weight. These "shading dyes" can be added by customary mixing or else be prepared chemically in the same reaction batch together with the above-described synthesis of a dye mixture of the invention and be incorporated into the dye mixture when one or more of the components of the shading dye are identical with the components of the dyes of the formulae (1), and/or (2).

The dye mixtures of the invention have useful application properties. They are used for dyeing or printing hydroxyl- and/or carboxamido-containing materials, for example in the form of sheetlike structures, such as paper and leather or of films, for example composed of polyamide, or in bulk, as for example of polyamide and polyurethane, but especially for dyeing or printing these materials in fiber form. Similarly, the solutions obtained in the synthesis of the dye mixtures of the invention, if desired after addition of a buffer substance, and also if desired after concentrating or diluting, can be used directly as liquid preparation for dyeing.

The present invention thus also provides for the use of the dye mixtures of the invention for dyeing or printing these materials, or rather to processes for dyeing or printing these materials in a conventional manner, by using a dye mixture of the invention or its individual components (dyes) individually together as colorant. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose, and also chemically modified cellulose fibers, such as aminated cellulose fibers or fibers as described for example in PCT Patent Application Publication Nos. WO 96/37641 and WO 96/37642 and also in European Patent Application Publication Nos. 0 538 785 and 0 692 559.

Carboxamido-containing materials are for example synthetic and natural polyamides and polyurethanes, especially in the form of fibers, for example wool and other animal hairs, silk, leather, nylon-6,6, nylon 6, nylon-11 and nylon-4.

The dye mixtures of the invention can be applied to and fixed on the substrates mentioned, especially the fiber materials mentioned, by the application techniques known for water-soluble dyes, especially fiber-reactive dyes. They are distinguished by an excellent color build-up and thus can be used to provide commercially particularly advantageously deep shades, especially, too, for example, deep brown shades when used with other dyes in trichromatic dyeing. Suitable combination partners are customary dyes having one or two fiber-reactive groups of the vinyl sulfone series or dyes having a fiber-reactive grouping of the monochlorotriazine/vinyl sulfone series combination.

For instance, on cellulose fibers they produce by the exhaust method both from a short and from a long liquor, for example in a liquor to goods ratio of 5:1 to 100:1, preferably 7:1 to 30:1, and using various acid-binding agents, for example sodium carbonate and sodium hydroxide, and optionally neutral salts, such as sodium chloride or sodium sulfate, dyeings having very good color yields which are improved compared with the individual dyes. Application is preferably from an aqueous bath at temperatures between 40° and 105° C., optionally at a temperature of up to 130° C. under superatmospheric pressure, but preferably at 30° to 95° C., especially 45° to 65° C., and optionally in the presence of customary dyeing auxiliaries. One possible procedure is to introduce the material into the dyebath containing the alkali and to gradually heat the bath to the desired dyeing temperature and to complete the dyeing process at that temperature; it is preferably also possible to start from a dyebath which optionally contains sodium carbonate and only later to add sodium hydroxide solution to the dyebath in the course of the dyeing process.

The neutral salts which speed up the exhaustion of the dyes can if desired not be added to the bath until after the actual dyeing temperature has been reached.

The mixtures of the invention are particularly useful in an exhaust process employing the progressive metering of sodium hydroxide solution to the dyebath as per the ®automet process (see for example EP-A-0 126 042 and EP-A-0 259 319) within the preferred temperature range from 45° to 65° C.

Particularly useful dye mixtures for such exhaust dyeing processes comprise dyes of the general formula (2) where n is 1.

The customary padding processes likewise provide excellent color yields and very good color build-up on cellulose fibers. The dye mixture is preferably applied to the material in an alkaline padding liquor, containing for example sodium carbonate and sodium hydroxide solution, and the dyes are allowed to become fixed on the material by batching at elevated temperature, for example at up to 60° C., but preferably at room temperature as per the cold pad-batch process. The fixing of the dyes on the material, however, can also be effected in a continuous manner, for example by means of a pad-dry-pad-steam process, by steaming or using dry heat in a conventional manner. Especially dye mixtures of the invention which contain dyes conforming to the general formula (2) where n is zero are advantageous for such padding processes.

Similarly, the customary printing processes for cellulose fibers, which can be carried out either single-phase, for example by printing with a print paste comprising sodium bicarbonate or some other acid-binding agent and by subsequent steaming at 100° to 103° C., or two-phase, for example by printing with a neutral or weakly acidic print paste and subsequent fixation either by passing the printed material through a hot electrolyte-comprising alkaline bath or by overpadding with an alkaline electrolyte-comprising padding liquor with subsequent batching of this treated material or subsequent steaming or subsequent treatment with dry heat, produce strong prints with well-defined contours and a clear white ground. The appearance of the prints is not greatly affected by variations in the fixing conditions.

When fixing by means of dry heat in accordance with the customary thermofix processes, hot air from 120° to 200° C. is used. In addition to the customary steam at 101° to 103° C. it is also possible to use superheated steam and high-pressure steam at temperatures of up to 160° C.

The acid-binding agents which effect the fixation of the dyes of the dye mixtures of the invention on the cellulose fibers include for example water-soluble basic salts of the alkali metals and likewise alkaline earth metals of inorganic or organic acids or compounds which liberate alkali in the heat, and furthermore alkali metal silicates. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, trisodium phosphate or waterglass or mixtures thereof, such as for example mixtures of sodium hydroxide solution and waterglass.

The dye mixtures of the invention are notable for a high yield of fixation when applied to the cellulose fiber materials by dyeing or printing. The cellulose dyeings obtained following the customary aftertreatment by rinsing to remove unfixed dye portions exhibit excellent wetfastnesses, in particular since such unfixed dye portions are easily washed off on account of their good solubility in cold water.

The dyeings and prints obtainable with the dye mixtures of the invention have bright hues; especially the dyeings and prints on cellulose fiber materials have good lightfastness and especially very good wetfastnesses, such as wash, milling, water, seawater, crossdyeing and acidic and also alkaline perspiration fastness properties, also good fastness to pleating, hotpressing and rubbing.

Furthermore, the dye mixtures of the invention can also be used for the fiber-reactive dyeing of wool. Moreover, wool which has been given a nonfelting or low-felting finish (cf. for example H. Rath, Lehrbuch der Textilchemie, Springer-Verlag, 3rd Edition (1972), p. 295–299, especially the finish by the Hercosett process (p. 298); J. Soc. Dyers and Colourists 1972, 93–99, and 1975, 3344) can be dyed with very good fastness properties. The process of dyeing on wool is here carried out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with 3 times the molar amount of an aminobenzenesulfonic acid and/or of an aminonaphthalenesulfonic acid or on the basis of a reaction product of for example stearylamine with ethylene oxide. For instance, the dye mixture of the invention is preferably subjected to the exhaust process initially from an acidic dyebath having a pH of about 3.5 to 5.5 under pH control and the pH is then, toward the end of the dyeing time, shifted into the neutral and perhaps weakly alkaline range up to a pH of 8.5 to bring about, especially for very deep dyeings, the full reactive bond between the dyes of the dye mixtures of the invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60° and 98° C. However, the dyeings can also be carried out at the boil or in sealed dyeing apparatus at temperatures of up to 106° C. Since the water solubility of the dye mixtures of the invention is very good, they can also be used with advantage in customary continuous dyeing processes. The color strength of the dye mixtures of the invention is very high.

The dye mixtures of the invention dye the materials mentioned, preferably fibers materials, in yellow shades having good fastness properties and low photochromism.

The Examples hereinbelow serve to illustrate the invention. Parts and percentages are by weight, unless otherwise stated. Parts by weight relate to parts by volume as the kilogram relates to the liter. The compounds described in the Examples in terms of a formula are in general prepared and isolated in the form of their salts, preferably sodium or potassium salts, and used for dyeing in the form of their salts. The starting compounds mentioned in the following Examples, especially Table Examples, can similarly be used in the synthesis in the form of the free acid or in the form of their salts, preferably alkali metal salts, such as sodium or potassium salts.

EXAMPLE 1

1000 parts of an aqueous solution containing 150 parts of the hereinbelow indicated dye of the formula (A), such as a synthesis solution of this dye, and 1000 parts of an aqueous solution containing 150 parts of the hereinbelow indicated dye of the formula (B), such as a synthesis solution of this dye

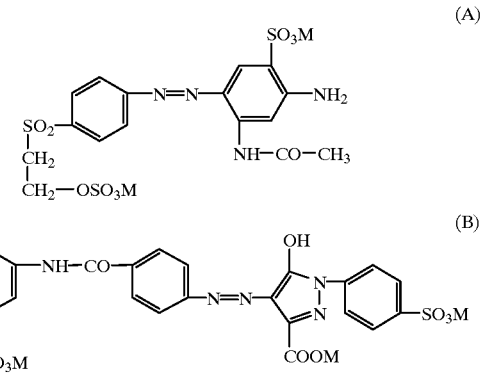

(where M is as defined above, preferably sodium) are mixed with each other. The dye mixture of the invention is isolated from the combined solution in a molar mixing ratio of dye (A) to dye (B) of 58:42 in a conventional manner, for example by spray drying the dye solution. The resultant dye mixture of the invention which contains electrolyte salts from the synthesis, such as sodium chloride and sodium sulfate, has very good dyeing properties and provides for example on cellulosic fiber materials, such as cotton, or regenerated cellulose fibers, strong and level yellow dyeings when applied by an exhaust dyeing process customary for fiber-reactive dyes.

EXAMPLE 2

1000 parts of an aqueous synthesis solution containing 59 parts of the dye of the formula (A) mentioned in Example 1 are mixed with 500 parts of an aqueous synthesis solution containing 63.5 parts of the dye of the formula (C)

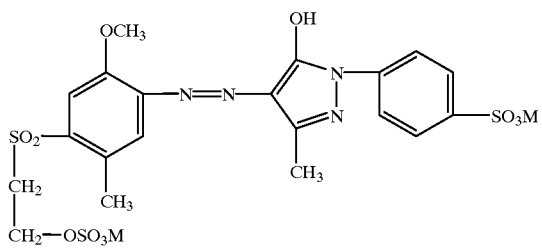

(where M is as defined above, preferably sodium) and the dye mixture of the invention is isolated, after the two synthesis solutions have been combined, in a conventional manner for example by spray drying the dye solution. The resultant dye mixture of the invention, which contains electrolyte salts from the synthesis, such as sodium chloride and sodium sulfate, and has a molar ratio of dye (A) to dye (C) of 50:50 has very good dyeing properties and provides for example on cellulosic fiber materials, such as cotton, or regenerated cellulose fibers, strong and level yellow dyeings when applied by a cold pad-batch process customary for fiber-reactive dyes.

EXAMPLES 3 to 19

The Table Examples hereinbelow describe further inventive dye mixtures comprising the dyes conforming to the general formulae (Y) and (Z)

$$D^1-N=N-K^1 \ (Y) \ D^2-N=N-K^2 \ (Z)$$

in terms of their components in the respective Table Example. They are preparable in a manner according to the invention either by mechanically mixing the individual dyes or their solutions or else chemically with the aid of their starting components, the diazo components conforming to the general formulae $D^1$—$NH_2$ and $D^2$—$NH_2$ and the coupling components of the general formulae H—$K^1$ and H—$K^2$.

The dye mixtures of the invention possess very good application properties and provide on the materials mentioned in the description part, especially cellulose fiber materials, when applied by the dyeing and printing application methods customary in the art, preferably by the application and fixing methods customary in the art for fiberreactive dyes, strong yellow dyeings and prints having good fastness properties and a good color build-up. The numerical ratios reported in the MR column specify the molar mixing ratio of the two dyes to each other in mol %.

| | Dye (Y) | | Dye (Z) | | MR of |
|---|---|---|---|---|---|
| Ex. | $D^1$ | $K^1$ | $D^2$ | $K^2$ | (Y):(Z) |
| 3 | 4-(β-sulfatoethyl-sulfonyl)phenyl | 2-acetylamino-5-sulfo-4-amino-phenyl | 4-[4'-(β-sulfato-ethylsulfonyl)-phenylamino-carbonyl]phenyl | 1-(4'-sulfophenyl)-3-methylpyrazol-5-on-4-yl | 50:50 |

-continued

| Ex. | Dye (Y) D¹ | K¹ | Dye (Z) D² | K² | MR of (Y):(Z) |
|---|---|---|---|---|---|
| 4 | 4-(β-sulfatoethyl-sulfonyl)phenyl | 2-acetylamino-5-sulfo-4-amino-phenyl | 3-[3'-(β-sulfato-ethylsulfonyl)-phenylamino-carbonyl]phenyl | 1-(4'-sulfophenyl)-3-carboxypyrazol-5-on-4-yl | 45:55 |
| 5 | 4-(β-sulfatoethyl-sulfonyl)phenyl | 2-acetylamino-5-sulfo-4-amino-phenyl | 3-[4'-(β-sulfato-ethylsulfonyl)-phenylamino-carbonyl]phenyl | 1-(4'-sulfophenyl)-3-carboxypyrazol-5-on-4-yl | 61:39 |
| 6 | 4-(β-sulfatoethyl-sulfonyl)phenyl | 2-acetylamino-5-sulfo-4-amino-phenyl | 2-methoxy-5-methyl-4-(β-sulfatoethyl-sulfonyl)phenyl | 1-(4'-sulfophenyl)-3-methylpyrazol-5-on-4-yl | 52:48 |
| 7 | 4-(β-sulfatoethyl-sulfonyl)phenyl | 2-acetylamino-5-sulfo-4-amino-phenyl | 2,5-dimethoxy-4-(β-sulfatoethyl-sulfonyl)phenyl | 1-phenyl-3-methyl-pyrazol-5-on-4-yl | 55:45 |
| 8 | 4-(β-sulfatoethyl-sulfonyl)phenyl | 2-acetylamino-5-sulfo-4-amino-phenyl | 4-(β-sulfatoethyl-sulfonyl)phenyl | 1-(4'-sulfophenyl)-3-carboxypyrazol-5-on-4-yl | 50:50 |
| 9 | 4-(β-sulfatoethyl-sulfonyl)phenyl | 2-acetylamino-5-sulfo-4-amino-phenyl | 2-methoxy-5-(β-sulfatoethyl-sulfonyl)phenyl | 1-(4'-sulfophenyl)-3-carboxypyrazol-5-on-4-yl | 57:43 |
| 10 | 4-(β-sulfatoethyl-sulfonyl)phenyl | 2-acetylamino-5-sulfo-4-amino-phenyl | 4-[4'-(β-sulfato-ethylsulfonyl)-phenylamino-carbonyl]phenyl | 1-(4'-sulfophenyl)-3-carboxypyrazol-5-on-4-yl | 46:54 |
| 11 | 4-(β-sulfatoethyl-sulfonyl)phenyl | 2-propionylamino-5-sulfo-4-amino-phenyl | 4-[4'-(β-sulfato-ethylsulfonyl)-phenylamino-carbonyl]phenyl | 1-(4'-sulfophenyl)-3-carboxypyrazol-5-on-4-yl | 50:50 |
| 12 | 4-(β-sulfatoethyl-sulfonyl)phenyl | 2-ureido-5-sulfo-4-aminophenyl | 4-[4'-(β-sulfato-ethylsulfonyl)-phenylamino-carbonyl]phenyl | 1-(4'-sulfophenyl)-3-carboxypyrazol-5-on-4-yl | 48:52 |
| 13 | 4-(β-sulfatoethyl-sulfonyl)phenyl | 2-(β-carboxy-propionyl)-5-sulfo-4-aminophenyl | 4-[4'-(β-sulfato-ethylsulfonyl)-phenylamino-carbonyl]phenyl | 1-(4'-sulfophenyl)-3-carboxypyrazol-5-on-4-yl | 57:43 |
| 14 | 4-(β-sulfatoethyl-sulfonyl)phenyl | 2-(β-sulfo-propionyl)-5-sulfo-4-aminophenyl | 4-[4'-(β-sulfato-ethylsulfonyl)-phenylamino-carbonyl]phenyl | 1-(4'-sulfophenyl)-3-methylpyrazol-5-on-4-yl | 50:50 |
| 15 | 4-(β-sulfatoethyl-sulfonyl)phenyl | 2-(β-hydroxy-propionyl)-5-sulfo-4-aminophenyl | 4-[4'-(β-sulfato-ethylsulfonyl)-phenylamino-carbonyl]phenyl | 1-(4'-sulfophenyl)-3-methylpyrazol-5-on-4-yl | 52:48 |
| 16 | 4-(β-sulfatoethyl-sulfonyl)phenyl | 2-acetylamino-5-methoxy-4-aminophenyl | 4-[4'-(β-sulfato-ethylsulfonyl)-phenylamino-carbonyl]phenyl | 1-(4'-sulfophenyl)-3-methylpyrazol-5-on-4-yl | 50:50 |
| 17 | 2-methoxy-5-(β-sulfatoethyl-sulfonyl)phenyl | 4-[4'-(β-sulfato-ethylsulfonyl)-phenylamino-carbonyl]phenyl | 4-[4'-(β-sulfato-ethylsulfonyl)-phenylamino-carbonyl]phenyl | 1-(4'-sulfophenyl)-3-carboxypyrazol-5-on-4-yl | 57:43 |
| 18 | 2,5-dimethoxy-4-(β-sulfatoethyl-sulfonyl)phenyl | 4-[4'-(β-sulfato-ethylsulfonyl)-phenylamino-carbonyl]phenyl | 4-[4'-(β-sulfato-ethylsulfonyl)-phenylamino-carbonyl]phenyl | 1-(4'-sulfophenyl)-3-carboxypyrazol-5-on-4-yl | 42:58 |
| 19 | 2-methoxy-5-(β-sulfatoethyl-sulfonyl)phenyl | 4-[4'-(β-sulfato-ethylsulfonyl)-phenylamino-carbonyl]phenyl | 4-[4'-(β-sulfato-ethylsulfonyl)-phenylamino-carbonyl]phenyl | 1-(4'-sulfophenyl)-3-carboxypyrazol-5-on-4-yl | 51:49 |

What is claimed is:

1. A dye mixture comprising one or more dyes selected from the group of the dyes of the hereinbelow indicated and defined general formula (1) and one or more dyes selected from the group of the dyes of the hereinbelow indicated and defined general formula (2) in a molar ratio of the dye or dyes (1) to the dye or dyes (2) of 75:25 to 25:75

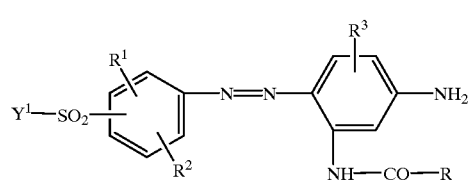

(1)

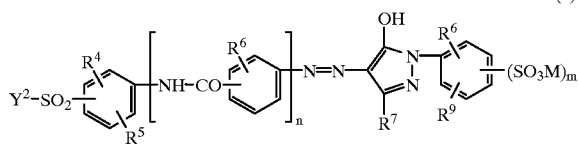

(2)

where:

M is hydrogen or an alkali metal;

$Y^1$ is vinyl or is ethyl which is substituted in the β-position by an alkali-eliminable substituent;

$Y^2$ has one of the meanings of $Y^1$;

$R^1$ is hydrogen, chlorine, alkyl of 1 to 4 carbon atoms, alkoxy of 1 to 4 carbon atoms, carboxyl or sulfo;

$R^2$ is hydrogen, alkyl of 1 to 4 carbon atoms or alkoxy of 1 to 4 carbon atoms;

$R^3$ is hydrogen, alkyl of 1 to 4 carbon atoms, alkoxy of 1 to 4 carbon atoms or sulfo;

R is amino or alkyl of 1 to 6 carbon atoms optionally substituted;

$R^4$ is hydrogen, chlorine, alkyl of 1 to 4 carbon atoms, alkoxy of 1 to 4 carbon atoms or sulfo;

$R^5$ is hydrogen, alkyl of 1 to 4 carbon atoms or alkoxy of 1 to 4 carbon atoms;

$R^6$ is hydrogen, alkyl of 1 to 4 carbon atoms, alkoxy of 1 to 4 carbon atoms or sulfo;

n is 1;

$R^7$ is methyl or carboxyl;

$R^8$ is hydrogen, alkyl of 1 to 4 carbon atoms, alkoxy of 1 to 4 carbon atoms or chlorine;

$R^9$ is hydrogen, alkyl of 1 to 4 carbon atoms, alkoxy of 1 to 4 carbon atoms or chlorine;

m is zero, 1 or 2 (when m is zero, this group is hydrogen).

2. A dye mixture as claimed in claim 1, wherein $R^1$ and $R^2$ are both hydrogen.

3. A dye mixture as claimed in claim 1, wherein R is methyl.

4. A dye mixture as claimed in claim 1, wherein $R^3$ is sulfo and disposed para to the —NH—CO—R group.

5. A dye mixture as claimed in claim 1, wherein $R^4$ and $R^5$ are both hydrogen.

6. A dye mixture as claimed in claim 1, wherein $R^8$ and $R^9$ are both hydrogen and m is 1.

7. A process for dyeing hydroxyl and/or carboxamido-containing material, comprising:

applying a dye mixture as claimed in claim 1 to said material, and fixing the thus-applied dye mixture on the material by means of heat or an alkaline agent or by means of both heat and an alkaline agent.

8. A dye mixture as claimed in claim 1, wherein $R^6$ is hydrogen.

9. A dye mixture as claimed in claim 1, wherein the $Y^1$—$SO_2$— and $Y^2$—$SO_2$— groups are attached to the benzene nucleus in the para position to the azo group and to the —NH—CO— group, respectively.

10. A dye mixture as claimed in claim 1, wherein $Y^1$ and $Y^2$ are independently vinyl, β-chloroethyl or β-sulfatoethyl.

11. A dye mixture as claimed in claim 1, wherein, in the dye of the general formula (1), the $Y^1$—$SO_2$— group is meta or para to the azo group, $Y^1$ is β-sulfatoethyl, $R^1$ and $R^2$ are both hydrogen, R is methyl and $R^3$ is bonded to the benzene nucleus para to the —NH—CO—R group and is sulfo.

12. A dye mixture as claimed in claim 1, wherein, in the dyes of the general formula (2), $R^4$ and $R^5$ are both hydrogen, the $Y^2$—$SO_2$— group is para to the —NH—CO— group, $Y^2$ is β-sulfatoethyl, the —NH—CO— group is para to the azo group, $R^6$, $R^8$ and $R^9$ are each hydrogen and m is 1 and this sulfo group is bonded to the benzene nucleus in para position to the nitrogen atom of the pyrazolone ring.

13. A dye mixture as claimed in claim 1, comprising a dye of the formula (A) and a dye of the formula (B)

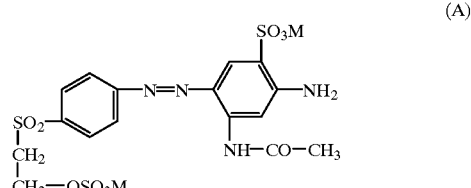

(A)

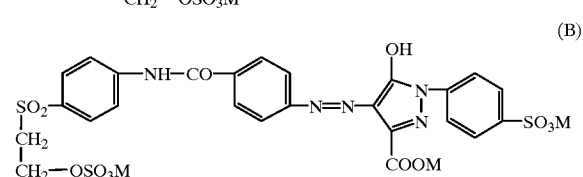

(B)

where M is as defined in claim 1.

14. A dye mixture as claimed in claim 1 wherein the dye or dyes of the general formula (1) and the dye or dyes of the general formula (2) are present in a molar mixing ratio of 60:40 to 40:60.

15. process as claimed in claim 7, wherein said material comprises fibers.

* * * * *